Feb. 10, 1953 M. VILLARD 2,627,734
UNIVERSAL JOINT
Filed Aug. 2, 1947 5 Sheets-Sheet 1
*Fig.3.*
*Fig.1.*
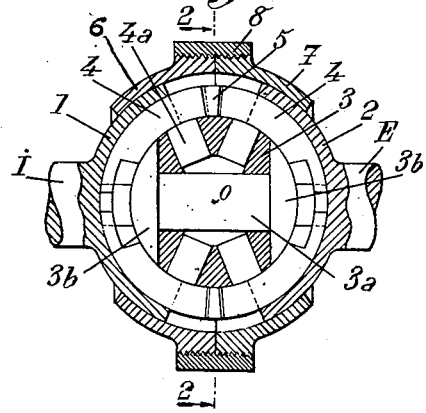
*Fig.2*
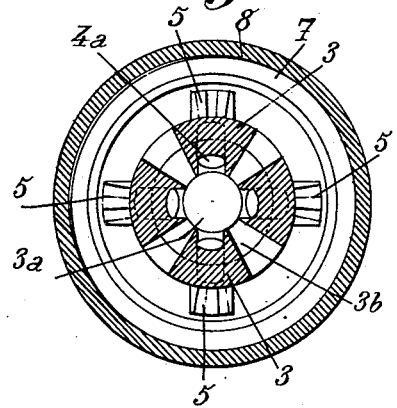
INVENTOR
MARCEL VILLARD
BY
*Toulmin & Toulmin*
ATTORNEYS Feb. 10, 1953   M. VILLARD   2,627,734
UNIVERSAL JOINT
Filed Aug. 2, 1947   5 Sheets-Sheet 2
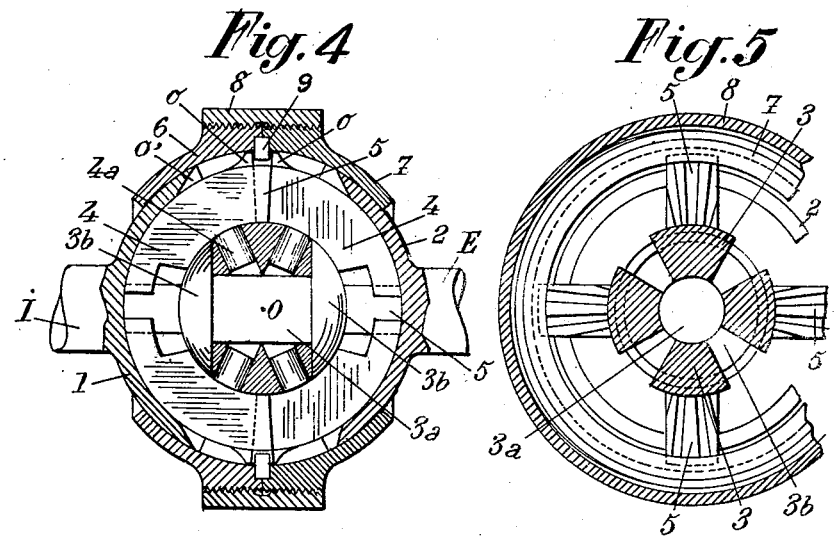
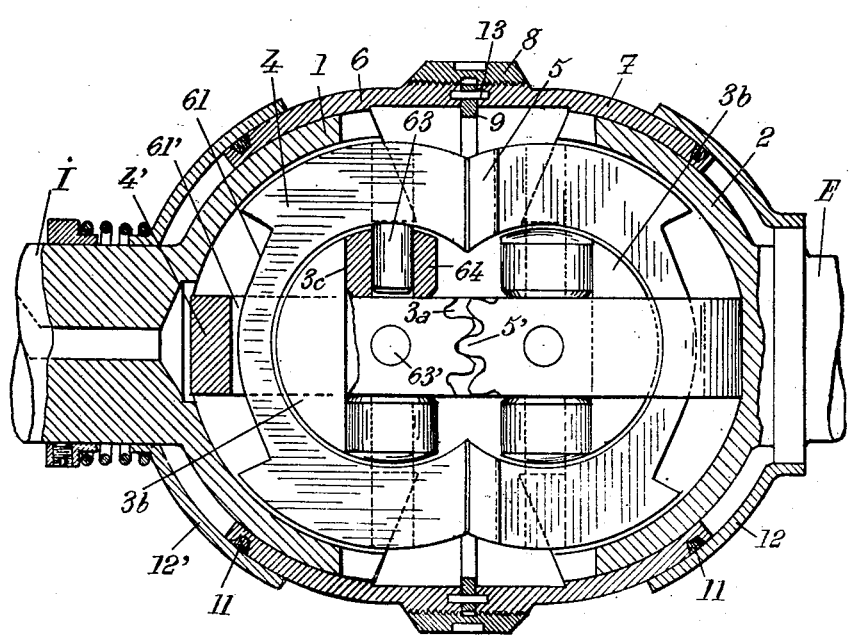
INVENTOR
MARCEL VILLARD
BY
Toulmin & Toulmin
ATTORNEYS Feb. 10, 1953 — M. VILLARD — 2,627,734
UNIVERSAL JOINT
Filed Aug. 2, 1947 — 5 Sheets-Sheet 3
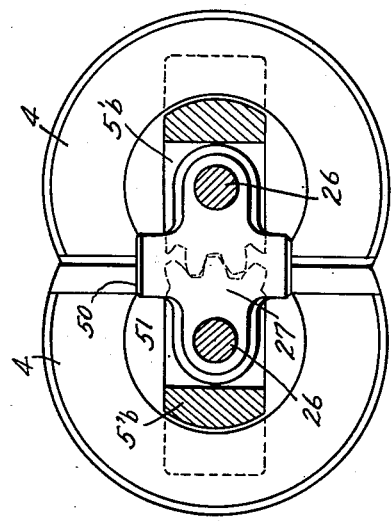
Fig. 13
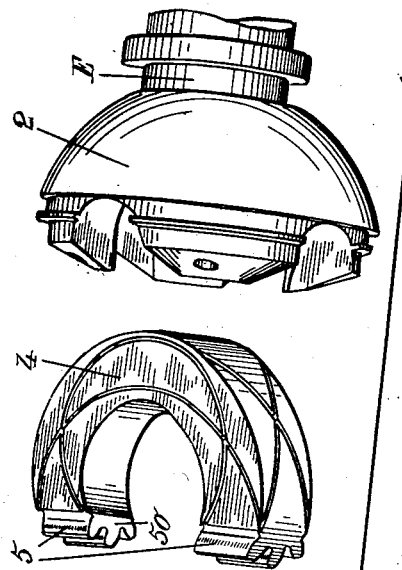
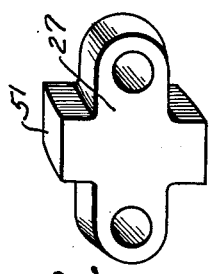
Fig. 12
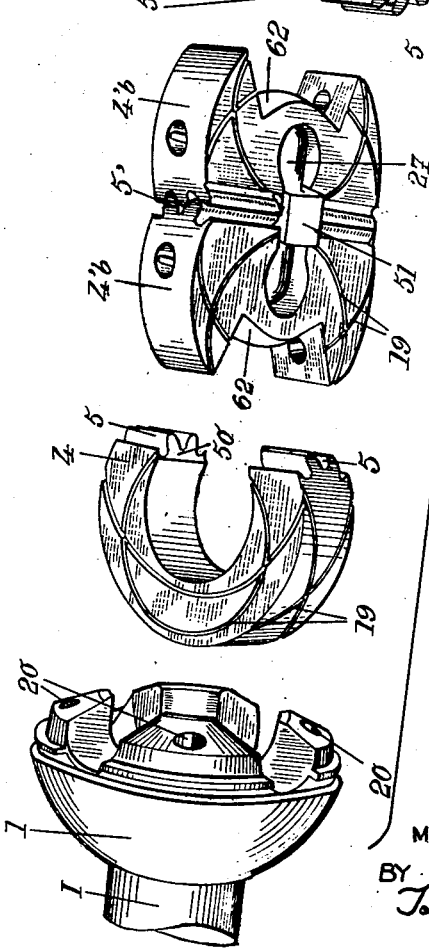
Fig. 7
INVENTOR
MARCEL VILLARD
BY
Toulmin & Toulmin
ATTORNEYS Feb. 10, 1953 M. VILLARD 2,627,734
UNIVERSAL JOINT
Filed Aug. 2, 1947 5 Sheets-Sheet 4
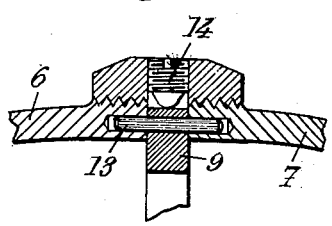
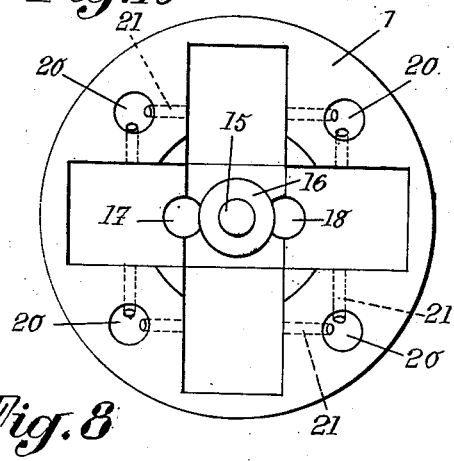
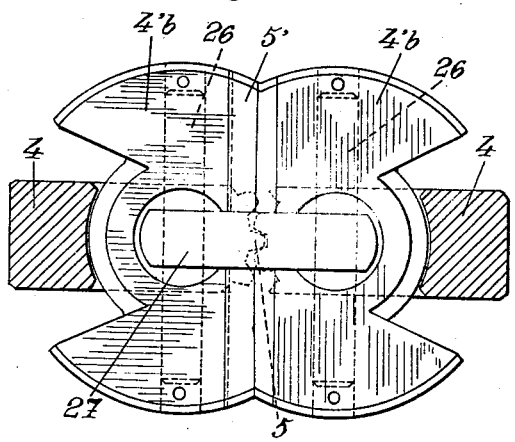
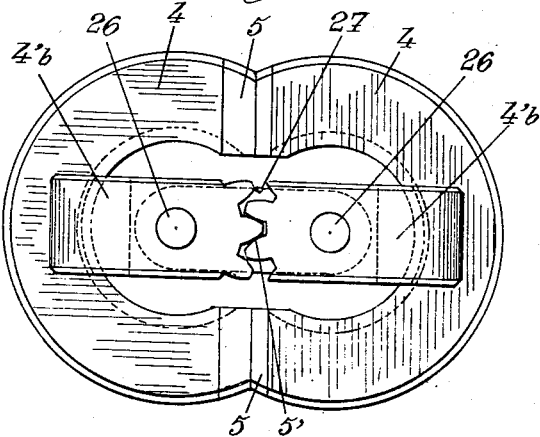
INVENTOR
MARCEL VILLARD
BY
Toulmin & Toulmin
ATTORNEYS Feb. 10, 1953 M. VILLARD 2,627,734
UNIVERSAL JOINT
Filed Aug. 2, 1947 5 Sheets-Sheet 5

INVENTOR
MARCEL VILLARD
BY
Toulmin & Toulmin
ATTORNEYS

Patented Feb. 10, 1953

2,627,734

UNITED STATES PATENT OFFICE 2,627,734

UNIVERSAL JOINT

Marcel Villard, Colombes, France

Application August 2, 1947, Serial No. 765,669
In France December 14, 1945

Section 1, Public Law 690, August 8, 1946
Patent expires December 14, 1965

7 Claims. (Cl. 64—21)

1

The present invention relates to universal joints and more especially universal joints of the constant speed type.

The chief object of my invention is to provide a joint of this kind which is better adapted to meet the requirements of practice than those used up to the present time, and in particular which has a high resistance to wear and tear and is capable of working in a satisfactory manner even when the angle between the driving shaft and the driven shaft is relatively large, and accomplishes this even though the volume occupied by the joint is small.

Preferred embodiments of my invention will be hereinafter described with reference to the accompanying drawings, given merely by way of example, and in which Fig. 1 is an axial section of a first embodiment of a universal joint according to my invention;

Fig. 2 is a section on the line 2—2 of Fig. 1;

Fig. 3 is a diagrammatical view of a modification of the joint of Figs. 1 and 2;

Figs. 4 and 5 are views similar to Figs. 1 and 2 but showing a supplementary feature of the joint construction;

Fig. 6 is an axial section of another modification of a universal joint according to my invention;

Fig. 7 is an exploded perspective view showing the elements of a joint made according to a modification of that of Fig. 6;

Figs. 8 and 9 are two elevational views at right angles to each other showing, assembled together, the main elements of a joint of the kind illustrated by Fig. 7;

Fig. 10 is a part view of an element of a joint of the kind illustrated by Fig. 7, to show the lubrication system;

Fig. 11 is a view on a larger scale showing a detail of a joint of the kind illustrated by Fig. 6;

Fig. 12 is a separate view of a modified form of an element of the joint structure;

Fig. 13 is a view similar to Fig. 9 showing an assembly incorporating the element of Fig. 12;

Figure 14:
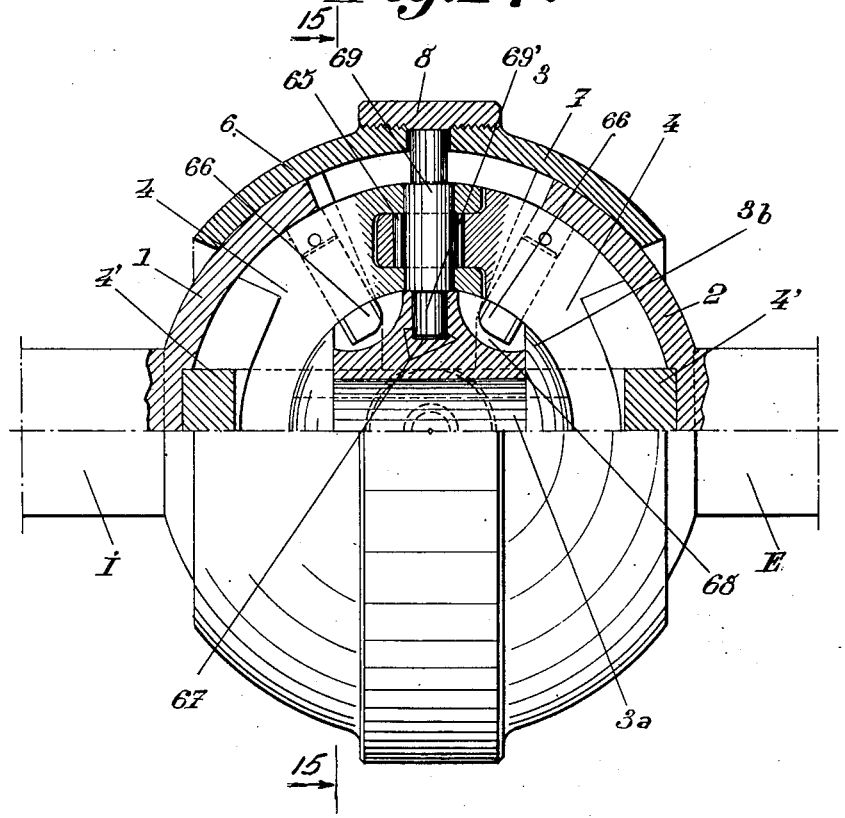
Fig. 14 is an elevational view, half in section, of a modification of the embodiment of Figs. 1 and 2.

In the embodiment of my invention illustrated by Figs. 1 and 2, the joint includes a driving shaft I and a driven shaft E. Each of these shafts is rigid with a spherical cap shaped part 1, 2, respectively which, for lack of a better term, will be

2 hereinafter called "fork," in its functional sense, by analogy with the forks of a Hook's joint. Each fork is provided with a plurality of circular grooves located in planes passing through the axis of the corresponding shaft (for instance two grooves located in planes at right angles to each other, in the embodiment shown by the drawings). In said grooves are fitted arcuate sliding pieces 4.

Each piece 4 is pivoted, about an axis 4a, to a second intermediate piece 3. Axis 4a is located in the middle plane of the groove in which the corresponding piece 4 is sliding; it intersects the axis of the corresponding shaft (I or E) and makes therewith an angle different from 90°.

This arrangement corresponds to the provision, between forks 1 and 2 of a plurality of transmission units (four in the example illustrated) each constituted by the combination of two elementary universal joints. The first elementary universal joint is constituted by fork 1, an intermediate piece 4 pivoted thereto about an axis at right angles to the plane of Fig. 1 and passing through the center O of the joint, and an intermediate piece 3 pivoted to said piece 4 about an axis 4a. The second elementary universal joint includes said intermediate piece 3, which is common to both elementary joints, the piece 4 shown on the right hand side of Fig. 1, and fork 2. The axes 4a of both elementary joints intersect each other at a point located in the middle transverse plane of piece 3.

In order to keep all these pieces 3 in positions such that the respective planes determined by each pair of axes 4a carried by a piece 3 intersect one another along a straight line passing constantly through point O and all these axes 4a intersect one another at said point O, said pieces 3 are journalled on a cylindrical part 3a rigid with two spherical elements 3b fitting in arcuate pieces 4.

The ends of all these arcuate pieces 4 nearer to the shafts are suitably cut away so as to enable them to cross one another when the joint is working with shafts I and E inclined to each other.

As shown by Fig. 2, the respective pieces 3 are disposed at suitable intervals from one another so that they can undergo independent respective angular displacements about the axis of cylindrical member 3a during the operation of the joint.

A spherical casing, made of two portions 6, 7 assembled together by a threaded ring 8 is mounted about forks 1 and 2.

Advantageously, according to a feature of my invention, the two arcuate members 4 of a given transmission unit (I, 1, 4, 4a, 3, 4a, 4, 2, E) are linked together through means ensuring symmetry with respect to a plane passing through the center of the joint. For instance, as shown by Figs. 1 and 2 said arcuate members are provided, at their adjacent ends, respectively, with intermeshing gear teeth 5 (bevel gears the axis of each of which coincides with the corresponding pivot axis 4a).

The embodiment diagrammatically illustrated by Fig. 3 is of the same general construction as that of Figs. 1 and 2 but diagrammatically shown (in particular, parts 3a and 3b are omitted). The only functional difference with the embodiment of Fig. 1 lies in the connection between corresponding arcuate elements 4. In Fig. 3, said elements are slidable in other elements 59 pivotally connected to each other about a spindle 59a guided at 60 with respect to piece 3.

The embodiment of Figs. 4 and 5 is similar to that of Figs. 1 and 2 but further includes the following feature:

Each of the arcuate pieces 4 is provided with a kind of shoulder O. The portions of the lateral (vertical in the drawing) walls of two shoulders facing each other (said shoulders being carried respectively by two cooperating pieces 4 in mesh at 5) are of cylindrical shape, the axes of these cylindrical surfaces coinciding with the axes of the gears 5 provided at the intermeshing ends of said arcuate pieces. These shoulders are spaced apart so as to leave between them an interval in which is engaged an annular projection 9 held between the portions 6 and 7 of the spherical casing that surrounds the forks. Thus said casing is constantly held in symmetrical position with respect to the joint.

In the embodiment of Fig. 6 the joint includes two shafts I and E integral with spherical forks 1 and 2. These forks are each provided with two circular grooves at right angles to each other and located in planes passing through the axis of the corresponding shaft I or E. In these grooves are slidably mounted arcuate pieces 4 and 4'. These arcuate pieces are provided with notches such as shown at 61 for piece 4 and 61' for piece 4' so as to enable pieces 4 and 4' to cross each other while keeping their freedom of movement in their respective grooves. Each of said arcuate pieces 4 and 4' extends along an angle greater than 180°. The ends of these pieces 4 and 4' are provided with spur gear teeth 5 and 5'. The teeth 5 of the two pieces 4 mesh together and the teeth 5' of the two pieces 4' mesh together.

Arcuate pieces 4 and 4' are fitted with studs 63 and 63' coaxial with gears 5 and 5' and on which are journalled rollers. The rollers carried by studs 63 are visible at 64. Those carried by studs 63' are not visible on the drawing. These rollers run on flat annular faces 3c of a central piece 3a—3b, the central portion 3a of which is cylindrical and the end portions 3b of which have spherical outer faces adapted to fit in the inner walls of arcuate pieces 4 and 4'. Thus the distance between the axes of gears 5 and between those of gears 5' is determined by the engagement of rollers 64 with surfaces 3c provided on a piece 3a—3b at a fixed distance from each other.

Forks 1 and 2 are slidable in casing elements 6 and 7 assembled together by threaded ring 8. Said forks are slidably guided with an easy fit by the engagement of the arcuate pieces 4 and 4' slidable therein with the spherical surfaces of portions 3b of the central piece 3a—3b.

Casing elements 6 and 7 are advantageously fitted with felt packing means 11 against which bear protection caps 12, 12' carried by shafts I and E.

Figs. 7 to 9 show a modification of the construction of Fig. 6 which is both simpler to manufacture and easier to assemble.

In this modification, forks 1 and 2 are still provided with crossed circular grooves located in planes passing through the axes of shafts I and E. Arcuate members 4 are similar to those of Fig. 6. But the elements 4' of Fig. 6 are replaced by solid disc elements 4'b the circular edges of which slidably engage in the corresponding grooves of forks 1 and 2, but which are provided with deep notches 62 owing to which elements 4 and 4'b can cross each other while keeping their relative freedom of sliding displacements in their respective grooves. The two elements 4'b are assembled together by means of a shackle 27 engaged at its ends on pins 26 provided in said elements 4'b (Fig. 8). Thus teeth 5' are constantly held in mesh together.

In order to facilitate lubrication, the surfaces of elements 4 and 4'b are provided with lubricating grooves 19. Each fork, for instance fork 1 (Fig. 10) is provided with a lubricant inlet hole 15, which opens into hole 16. On either side of this last mentioned hole and in communication therewith are provided delivery holes 17, 18 opening into the groove of arcuate piece 4.

Fork 1 is further provided with holes 20 interconnected through conduits 21.

Preferably, in order to obtain a good assembly of casing elements 6 and 7 (Fig. 6), said elements, and also ring 9, which is interposed between them, are provided with holes adapted to accommodate locking pins 13 provided at intervals along the circumference of the casing. Threaded ring 8, which assembles the casing elements 6 and 7 together, once brought into desired position, can be held therein by means of screws 14 engaged therein and bearing against the outer cylindrical face of ring 9 (Fig. 11).

According to still another feature of my invention, especially shown by Figs. 12 and 13, and also visible on Fig. 7, arcuate members 4 are each provided, at the ends of its inner cylindrical wall, with flat faces 50, parallel to and equidistant from the plane of symmetry of said piece 4, that is to say at right angles to the generatrices of teeth 5. These surfaces 50 are adapted to cooperate with the faces 51 of lateral projections provided in the middle part of shackle 27, these faces being preferably portions of parallel cylinders.

Thus arcuate members 4 are kept in correct position with respect to their forks and their respective gear portions 5 cannot slide relatively to each other in the longitudinal direction of the teeth.

Figure 15:
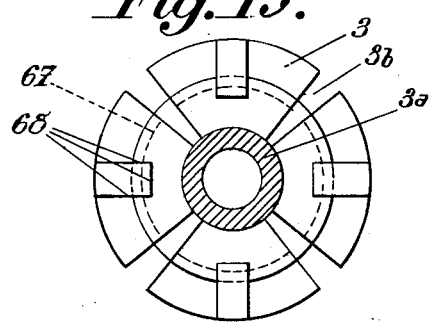
Fig. 15 shows the inner elements of the joint of Fig. 14, in section on the line 15—15 of Fig. 14.

The embodiment of Figs. 14 and 15 is of the same kind as that of Figs. 1 and 2, but with the following differences:

Instead of extending along an arc of about one quarter of a circumference, arcuate pieces 4 and 4' extend over arcs corresponding substantially to semi-circumferences. They are provided with corresponding notches so as to cross each other while moving freely.

Secondly, the corresponding pieces 4 and 4' are assembled together by pivot pins 69, preferably with the interposition of needle bearings 65. Pins 69 are carried by casing 6—7—8 and their inner ends 69' are engaged in grooves 67 of pieces 3. Furthermore, the pivot pins 66 of pieces 4 are slidable in longitudinal grooves 68 of pieces 3.

What I claim is:

1. A joint which comprises, in combination, a driving shaft and a driven shaft, a spherical fork rigid with each of said shafts, respectively, each of said forks being provided, in its inner face, with at least two grooves located in respective planes at right angles to each other and passing through the axis of the corresponding shaft, arcuate pieces slidably guided in said grooves, respectively, one of the two pieces engaged in each fork being of circular, partly annular shape and extending over an angle greater than 180°, the other of said two pieces being solid and in the form of a portion of a circular disc, with a notch formed therein to permit free passage of the other of said two pieces for all relative position of said pieces, spur gears integral with said pieces at the ends thereof, having their teeth edges parallel to the plane of the grooves in which they are guided, respectively, said pieces meshing together two by two through their respective gears, and means for permanently interconnecting the two pieces in the form of portions of circular discs to keep their respective gears in meshing relation.

2. A joint which comprises, in combination, a driving shaft and a driven shaft, a spherical fork rigid with each of said shafts, respectively, each of said forks being provided, in its inner face, with at least two grooves located in respective planes at right angles to each other and passing through the axis of the corresponding shaft, two pairs of pieces slidably guided in said grooves respectively, each of said pieces being of circular outline extending over an angle greater than 180°, and gear teeth integral with said pieces at the ends thereof, said teeth being parallel to the plane of the groove in which the pertaining piece is guided, respectively, said pieces meshing together two by two through their respective gear teeth, shackle means to which two of the pieces are pivoted, and means connected with the shaft ends holding said ends in pivotal relation with each other.

3. A joint which comprises, in combination, a driving shaft and a driven shaft, a spherical fork rigid with each of said shafts, each of said forks being provided in its inner face with at least two arcuate grooves located in respective planes at right angles to each other and containing the axis of the corresponding shaft, an arcuate piece slidably guided in each said groove, one of the two pieces engaged in each fork being of a portion of a circular ring shape and extending over an angle greater than 180°, the other of said two pieces being solid and in the form of a portion of a circular disc, with a notch formed therein to permit free passage of the other of said two pieces for all relative positions of said pieces, gear teeth integral with said pieces at the ends thereof, said teeth being parallel to the plane of the groove in which the pertaining piece is guided, said pieces meshing together two by two through their respective gear teeth, shackle means to which a corresponding meshing pair of said pieces are pivoted, and means enclosing said forks holding said shafts in pivotal relation with each other.

4. A universal joint for establishing connections between a driving and a driven shaft comprising: a fork adapted for rigid connection with each of said shafts, each said fork having the configuration of a sphere on the side thereof opposite the other fork, each said fork having arcuate grooves in the other side in angularly related planes passing through the axis of the connected shaft and each said groove being formed as the arc of a circle about the same center as the said spherical surface of the pertaining fork, an arcuate piece slidably fitting in each said groove and each said piece extending over an angle of at least 180° measured in the plane of the said piece, each said piece having its ends in engagement with the ends of a corresponding piece in the other fork, means providing pivotal action of each piece on the piece which it engages about an axis extending through the said center pertaining to the said piece and at right angles to the axis of the connected shaft, said means also providing a driving connection between said pieces in a direction at right angles to their respective planes, housing means surrounding said forks and comprising spherical portions engaging the spherical surfaces of the said forks whereby the joint is retained assembled with the said forks pivotally connected with each other, and means in said joint pivotally connecting two of said engaging pieces and being on pivot axes coinciding with the respective axes extending through the said center of the pertaining arcuate piece, said last-mentioned means including lateral projections having flat outer surfaces, at least two of said arcuate pieces having opposing flat faces on the ends and bearing on said flat outer surfaces.

5. In a universal joint for effecting connection between a driving and a driven shaft: a fork adapted for rigid connection with the end of each shaft, each fork comprising a spherical surface on the side thereof opposite the other said fork which is formed about a center on the axis of the connected shaft on the side of the fork toward the other said fork, each said fork also comprising angularly related arcuate grooves in the side toward the other fork formed as arcs of circles about the said center pertaining to the said fork and the planes of said grooves passing through the axis of the connected shaft, an arcuate piece slidably fitting in each groove and said pieces having movement independent of each other in their respective grooves, each piece defining an angle about the pertaining center greater than 180°, gear teeth formed on the ends of said pieces and defining gear segments thereon on a common axis extending through the pertaining one of said centers, the gear teeth on the ends of each said piece meshing with the gear teeth on the ends of a corresponding piece in the other fork, a housing enclosing said forks and comprising spherical internal surfaces engaging the spherical surfaces on said forks, whereby the joint is maintained in assembled relation with the forks pivotally connected with each other, and means in said joint pivotally connected with two of said meshing pieces and on pivot axes coinciding with the axes of the pertaining gear segments formed on the ends of the said pieces.

6. A universal joint comprising: a pair of forks adapted for being respectively rigidly mounted on the shafts to be connected by the joint, said forks having a spherical configuration on their shaft sides formed about a center lying on the axis of the connected shaft and on the side of the fork toward the other fork, each fork also comprising grooves in planes at right angles to each other in the side toward the other fork, said planes passing through the axis of the connected shaft and said grooves being formed as arcs of circles about the said center for the pertaining fork, a piece slidably fitting in each groove and at least one of the pieces for each fork being notched so the pieces pertaining to the said fork will have independent movement in their respective grooves, each said piece defining an angle about the pertaining center greater than 180°, each said piece having gear teeth formed on its ends defining gear segments on an axis in a plane parallel to the plane of the groove for the said piece and passing through the said center, the gear teeth on the ends of each piece meshing with those on a corresponding piece on the other fork, a housing enclosing said forks and having spherical internal surfaces engaging the spherical surfaces on the forks whereby the joint is maintained assembled and the forks are pivotally connected with each other, and a shackle member in said joint pivotally connected with two of the said meshing pieces and on pivot axes coinciding with the axes of the pertaining gear segments formed on the ends of the said pieces.

7. A universal joint comprising: a pair of forks adapted for being respectively rigidly mounted on the shafts to be connected by the joint, said forks having a spherical configuration on their shaft sides formed about a center lying on the axis of the connected shaft and on the side of the fork toward the other fork, each fork also comprising grooves in planes at right angles to each other in the side toward the other fork, said planes passing through the axis of the connected shaft and said grooves being formed as arcs of circles about the said center for the pertaining fork, a piece slidably fitting in each groove and at least one of the pieces for each fork being notched so the pieces pertaining to the said fork will have independent movement in their respective grooves, each said piece defining an angle about the pertaining center greater than 180°, each said piece having gear teeth formed on its ends defining gear segments on an axis in a plane parallel to the plane of the groove for the said piece and passing through the said center, the gear teeth on the ends of each piece meshing with those on a corresponding piece on the other fork, a housing enclosing said forks and having spherical internal surfaces engaging the spherical surfaces on the forks whereby the joint is maintained assembled and the forks are pivotally connected with each other, and a shackle member in said joint pivotally connected with two of the said meshing pieces and on pivot axes coinciding with the axes of the pertaining gear segments formed on the ends of the said pieces, said shackle also comprising projections thereon engaging the inner sides of the other two of the meshing pieces for maintaining the said other pieces in proper position within said joint.

MARCEL VILLARD.

REFERENCES CITED

The following references are of record in the file of this patent:

UNITED STATES PATENTS

| Number | Name | Date |
|---|---|---|
| 1,868,540 | Myers | July 26, 1932 |
| 1,945,209 | Villard | Jan. 30, 1934 |
| 2,236,839 | Salvetti | Apr. 1, 1941 |
| 2,293,204 | Greenfield | Aug. 18, 1942 |
| 2,365,606 | Taylor | Dec. 19, 1944 |